United States Patent
Zhang et al.

(10) Patent No.: US 11,770,747 B2
(45) Date of Patent: Sep. 26, 2023

(54) TRANSIENT PERIOD OPERATION FOR L1/L2 BASED CELL HANDOVER

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 17/124,843

(22) Filed: Dec. 17, 2020

(65) Prior Publication Data
US 2021/0219194 A1 Jul. 15, 2021

Related U.S. Application Data
(60) Provisional application No. 62/959,827, filed on Jan. 10, 2020.

(51) Int. Cl.
H04W 36/00 (2009.01)
H04W 36/32 (2009.01)
(Continued)

(52) U.S. Cl.
CPC ....... *H04W 36/0069* (2018.08); *H04L 1/1819* (2013.01); *H04L 5/0023* (2013.01);
(Continued)

(58) Field of Classification Search
CPC . H04W 36/0069; H04W 36/32; H04W 76/27; H04W 24/08; H04W 24/06;
(Continued)

(56) References Cited

U.S. PATENT DOCUMENTS

2014/0362750 A1* 12/2014 Song ................. H04W 52/0206
370/311
2016/0262066 A1* 9/2016 Ozturk ................. H04W 76/30
(Continued)

FOREIGN PATENT DOCUMENTS

EP 3557907 A1 10/2019
WO 2018085049 A1 5/2018

OTHER PUBLICATIONS

Ericsson: "Comparison of MBB and DC Based Handover", 3GPP TSG-RAN WG2#105bis, 3GPP Draft; R2-1903511—Comparison of MBB and DC Based Handover, 3rd Generation Partnership Project (3GPP), Mobile Competence Centre; 650, Route Des Lucioles; F-06921 Sophia-Antipolis Cedex; Franc, vol. RAN WG2, No. Xian, China; Apr. 8, 2019-Apr. 12, 2019, Mar. 28, 2019, 5 Pages, XP051692778, URL: http://www.3gpp.org/ftp/tsg%5Fran/WG2%5FRL2/TSGR2%5F105bis/Docs/R2%2D1903511%2Ezip.
(Continued)

*Primary Examiner* — Candal Elpenord
(74) *Attorney, Agent, or Firm* — Danai Nelisile Mhembere; Patterson & Sheridan, LLP

(57) ABSTRACT

Aspects of the present disclosure provide apparatus, methods, processing systems, and computer readable mediums for enabling L1 (physical layer) and L2 (medium access control (MAC) layer) inter-cell mobility. More specifically, rules and operations performed during L1/L2 based cell handover operations. In certain aspects, a user equipment (UE) is configured to receive, from a network entity of a source cell via at least one of L1 or L2 signaling, a handover command for the UE to handover from the source cell to a target cell. The UE may determine at least one transient period during which the UE is served by both the source cell and the target cell, and perform the handover while com-
(Continued)

municating with the source cell and target cell during the transient period.

28 Claims, 12 Drawing Sheets

(51) Int. Cl.
*H04W 80/02* (2009.01)
*H04W 74/08* (2009.01)
*H04W 72/04* (2023.01)
*H04L 5/00* (2006.01)
*H04W 24/08* (2009.01)
*H04W 76/27* (2018.01)
*H04L 1/18* (2023.01)
*H04L 1/1812* (2023.01)
*H04W 72/0453* (2023.01)
*H04W 72/0446* (2023.01)
*H04W 72/23* (2023.01)

(52) U.S. Cl.
CPC ........... *H04W 24/08* (2013.01); *H04W 36/32* (2013.01); *H04W 72/0446* (2013.01); *H04W 72/0453* (2013.01); *H04W 72/23* (2023.01); *H04W 74/0833* (2013.01); *H04W 76/27* (2018.02); *H04W 80/02* (2013.01)

(58) Field of Classification Search
CPC ............... H04W 24/04; H04W 72/042; H04W 72/0446; H04W 72/0453; H04W 74/0833; H04W 80/02; H04L 1/1819; H04L 5/0023
USPC .................................................. 370/331–332
See application file for complete search history.

(56) References Cited

U.S. PATENT DOCUMENTS

| | | | |
|---|---|---|---|
| 2018/0279182 A1 | 9/2018 | Sang et al. | |
| 2018/0302827 A1* | 10/2018 | Mitsui | H04W 76/15 |
| 2020/0260342 A1* | 8/2020 | Vaidya | H04W 36/0083 |
| 2020/0314717 A1* | 10/2020 | Kim | H04W 74/0833 |
| 2020/0351729 A1* | 11/2020 | Rastegardoost | H04W 36/0072 |
| 2020/0389886 A1* | 12/2020 | Lee | H04W 74/04 |
| 2021/0136635 A1* | 5/2021 | Kim | H04W 36/0022 |
| 2022/0053388 A1* | 2/2022 | Kim | H04W 36/0044 |
| 2022/0124568 A1* | 4/2022 | Wu | H04W 76/19 |
| 2022/0279403 A1* | 9/2022 | Yang | H04W 36/00835 |

OTHER PUBLICATIONS

Intel: "Feature Lead Summary on Simultaneous Tx/Rx", 3GPP TSG RAN WG1#96, 3GPP Draft; R1-1903323, 3rd Generation Partnership Project (3GPP), Mobile Competence Centre; 650,Route Des Lucioles; F-06921 Sophia-Antipolis Cedex; France, vol. RAN WG1, No. Athens, Greece; Feb. 25, 2019-Mar. 1, 2019, Feb. 26, 2019 (Feb. 26, 2019), XP051600998, Retrieved from the Internet: URL: http://www.3gpp.org/ftp/tsg%5Fran/WG1%5FRL1/TSGR1%5F96/Docs/R1%2D1903323%2Ezip [retrieved on Feb. 26, 2019] p. 2.
International Search Report and Written Opinion—PCT/US2020/065989—ISA/EPO—dated Apr. 16, 2021.

* cited by examiner

TRANSIENT PERIOD OPERATION FOR L1/L2 BASED CELL HANDOVER

CROSS-REFERENCE TO RELATED APPLICATION(S)

This application claims benefit of and priority to U.S. Provisional Application No. 62/959,827, filed Jan. 10, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for enabling L1/L2 inter-cell mobility.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include defining operations performed during one or more transient periods of a cell handover.

In certain aspects, a method for wireless communications by a user equipment (UE) is described. The method includes receiving, from a network entity of a source cell via at least one of physical layer signaling or medium access control (MAC) layer signaling, a handover command for the UE to handover from the source cell to a target cell. The method includes determining at least one transient period during which the UE is served by both the source cell and the target cell. The method includes performing the handover while communicating with the source cell and target cell during the transient period.

In certain aspects, a method for wireless communications by a network entity of a source cell is described. The method includes transmitting, to a user equipment (UE) via at least one of physical layer signaling or medium access control (MAC) layer signaling, a handover command for the UE to handover from the source cell to a target cell. The method includes determining at least one transient period during which the UE is served by both the source cell and target cell. The method includes performing the handover while communicating with the UE during the transient period.

In certain aspects, a user equipment (UE) is described. The UE includes a transceiver, a memory, and a processor coupled to the transceiver and the memory. The memory includes code executable by the processor to cause the UE to receive, from a network entity of a source cell via at least one of physical layer signaling or medium access control (MAC) layer signaling, a handover command for the UE to handover from the source cell to a target cell. The memory includes code executable by the processor to cause the UE to determine at least one transient period during which the UE is served by both the source cell and the target cell. The memory includes code executable by the processor to cause the UE to perform the handover while communicating with the source cell and target cell during the transient period.

In certain aspects, a network entity of a source cell is described. The network entity includes a transceiver, a memory, and a processor coupled to the transceiver and the memory. The memory includes code executable by the processor to cause the network entity to transmit, to a user equipment (UE) via at least one of physical layer signaling or medium access control (MAC) layer signaling, a handover command for the UE to handover from the source cell to a target cell. The memory includes code executable by the processor to cause the network entity to determine at least one transient period during which the UE is served by both the source cell and target cell. The memory includes code executable by the processor to cause the network entity to perform the handover while communicating with the UE during the transient period.

In certain aspects, a user equipment (UE) is described. The UE includes means for receiving, from a network entity of a source cell via at least one of physical layer signaling or medium access control (MAC) layer signaling, a handover command for the UE to handover from the source cell to a target cell. The UE includes means for determining at least one transient period during which the UE is served by both the source cell and the target cell. The UE includes means for performing the handover while communicating with the source cell and target cell during the transient period.

In certain aspects, a network entity of a source cell is described. The network entity includes means for transmitting, to a user equipment (UE) via at least one of physical layer signaling or medium access control (MAC) layer signaling, a handover command for the UE to handover from the source cell to a target cell. The network entity includes means for determining at least one transient period during which the UE is served by both the source cell and target cell. The network entity includes means for performing the handover while communicating with the UE during the transient period.

In certain aspects, a non-transitory computer-readable storage medium that stores instructions that when executed by a processor of a user equipment (UE) cause the UE to perform a method for wireless communication. The method includes receiving, from a network entity of a source cell via at least one of physical layer signaling or medium access control (MAC) layer signaling, a handover command for the UE to handover from the source cell to a target cell. The method includes determining at least one transient period during which the UE is served by both the source cell and the target cell. The method includes performing the handover while communicating with the source cell and target cell during the transient period.

In certain aspects, a non-transitory computer-readable storage medium that stores instructions that when executed by a processor of a network entity of a source cell cause the network entity to perform a method for wireless communication. The method includes transmitting, to a user equipment (UE) via at least one of physical layer signaling or medium access control (MAC) layer signaling, a handover command for the UE to handover from the source cell to a target cell. The method includes determining at least one transient period during which the UE is served by both the source cell and target cell. The method includes performing the handover while communicating with the UE during the transient period.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
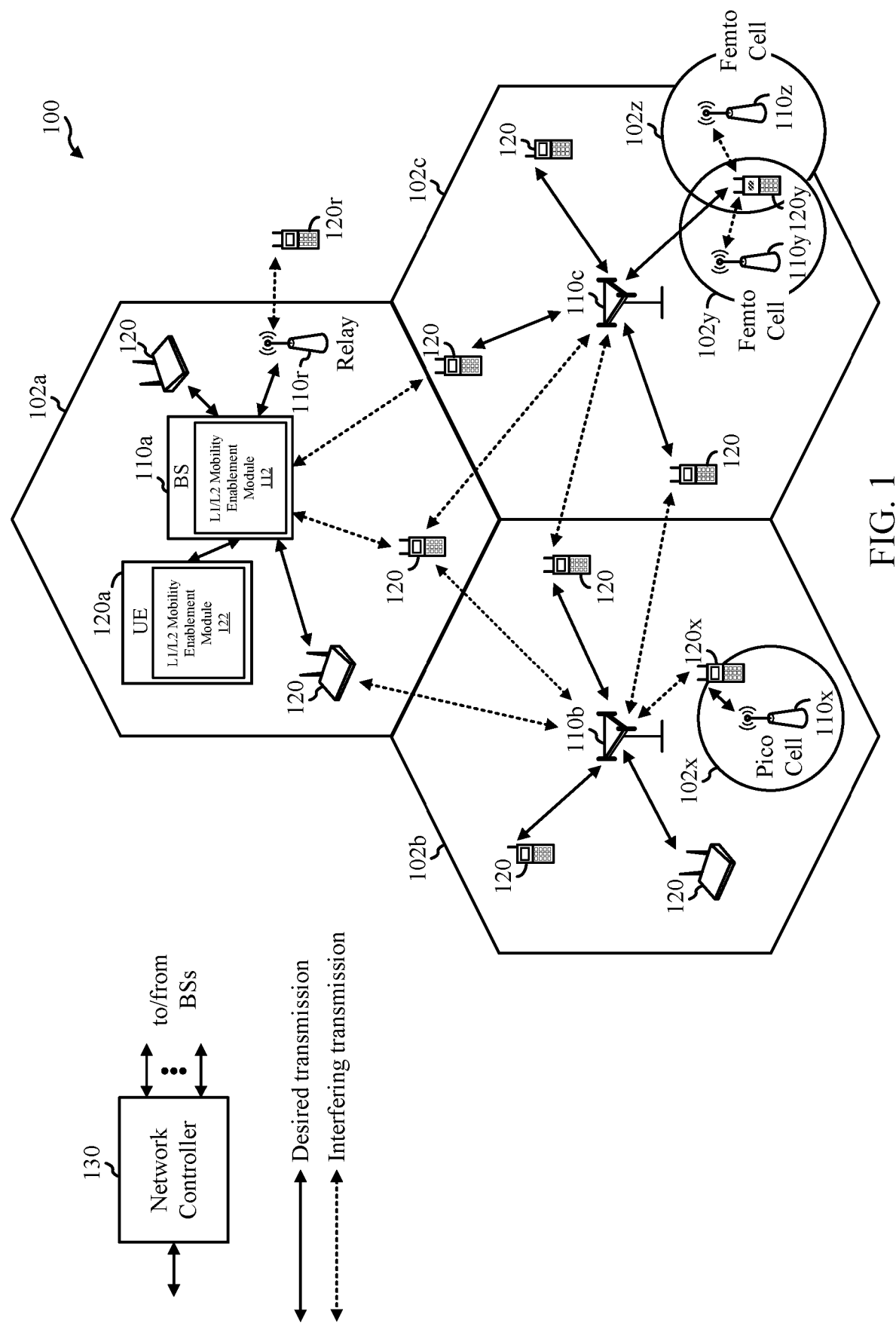
FIG. 1 is a block diagram conceptually illustrating an example wireless communication network, in accordance with certain aspects of the present disclosure.

Aspects of the present disclosure provide apparatus, methods, processing systems, and computer readable mediums for enabling layer 1 (L1) and/or layer 2 (L2) inter-cell mobility during handovers (HOs). L1 and L2 control signaling support communication over downlink and uplink channels. This control signaling is often referred to as L1/L2 control signaling, indicating that the corresponding information originates from the physical layer (layer 1) and/or from medium access control (MAC) (layer 2). L1/L2 control signaling may be communicated over control channels, such as a physical uplink control channel (PUCCH) and/or a physical downlink control channel (PDCCH). It should be noted that in some cases, a physical uplink shared channel (PUSCH) may also carry L1 control signaling (e.g., uplink control information (UCI)).

The following description provides examples of transient period operation for L1/L2 based cell handover in wireless communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the BSs 110 and UEs 120 may be configured to determine one or more transient periods during a cell handover, and perform certain operations during the transient periods. As shown in FIG. 1, the BS 110a includes an L1/L2 mobility enablement module 112 configured to transmit, to a user equipment (UE) via at least one of physical layer signaling or medium access control (MAC) layer signaling, a handover command for the UE to handover from the source cell to a target cell. The L1/L2 mobility enablement module 112 is also configured to determine at least one transient period during which the UE is served by both the source cell and target cell. The L1/L2 mobility enablement module 112 is also configured to perform the handover while communicating with the UE during the transient period.

The UE 120a includes an L1/L2 mobility enablement module 122 configured to receive, from a network entity of a source cell via at least one of physical layer signaling or medium access control (MAC) layer signaling, a handover command for the UE to handover from the source cell to a target cell. The L1/L2 mobility enablement module 122 is also configured to determine at least one transient period during which the UE is served by both the source cell and the target cell. The L1/L2 mobility enablement module 122 is also configured to perform the handover while communicating with the source cell and target cell during the transient period, in accordance with aspects of the present disclosure.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
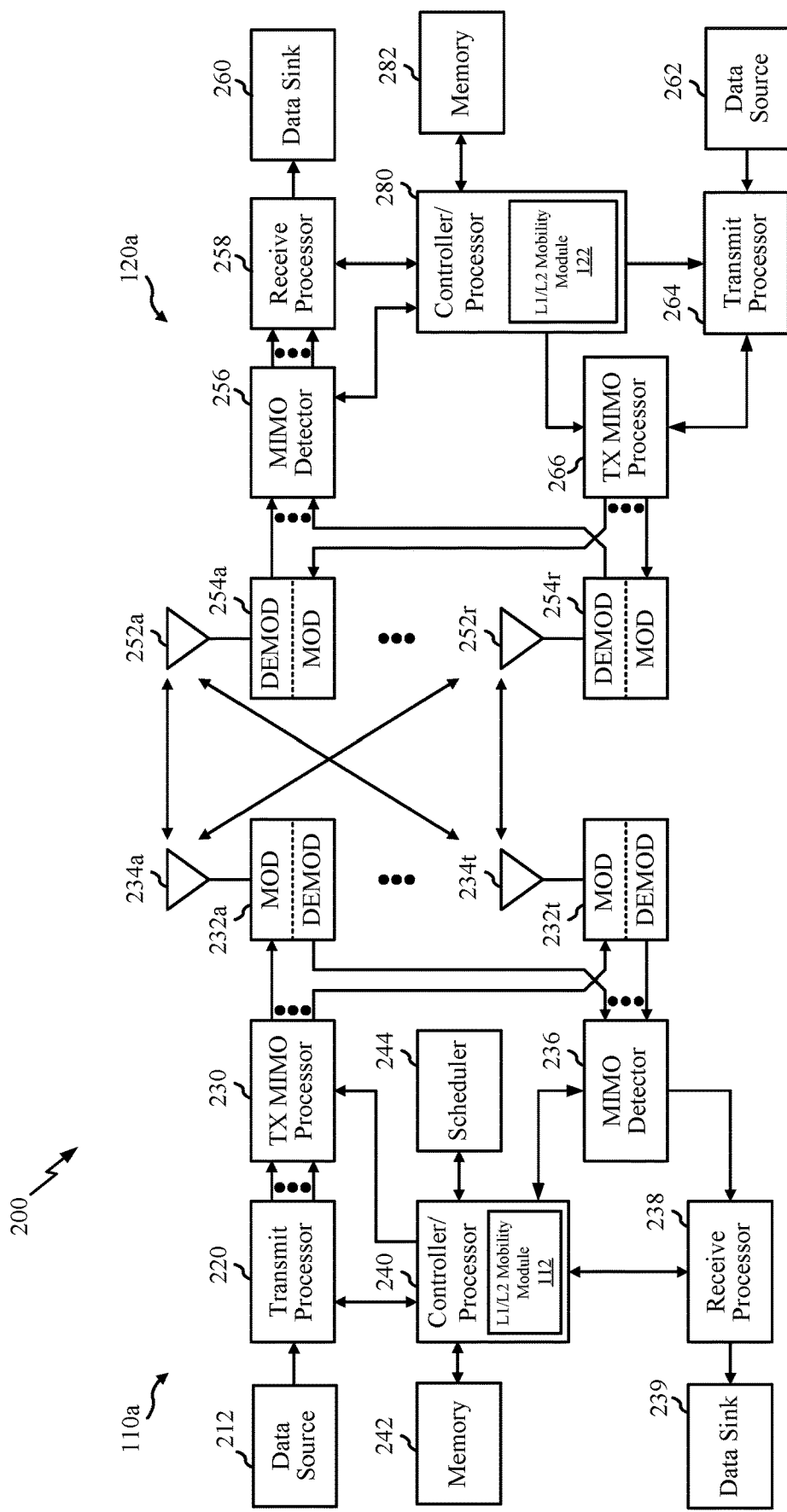
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120 has an L1/L2 mobility module 122 configured to receive, from a network entity (e.g., BS 110a) of a source cell via at least one of physical layer signaling or medium access control (MAC) layer signaling, a handover command for the UE 120a to handover from the source cell to a target cell. The L1/L2 mobility enablement module 122 is also configured to determine at least one transient period during which the UE 120a is served by both the source cell and the target cell. The L1/L2 mobility enablement module 122 is also configured to perform the handover while communicating with the source cell and target cell during the transient period, in accordance with aspects of the present disclosure.

The controller/processor 240 and/or other processors and modules at the BS 110a may perform or direct the execution of processes for the techniques described herein. As shown in FIG. 2, the controller/processor 240 of the BS 110a has an L1/L2 mobility enablement module 112 configured to transmit, to the UE 120a via at least one of physical layer signaling or medium access control (MAC) layer signaling, a handover command for the UE 120a to handover from the source cell to a target cell. The L1/L2 mobility enablement module 112 is also configured to determine at least one transient period during which the UE 120a is served by both the source cell and target cell. The L1/L2 mobility enablement module 112 is also configured to perform the handover while communicating with the UE 120a during the transient period.

Although shown at the controller/processor of the UE 120a and BS 110a, other components of the UE 120a or BS 110a may be used to perform the operations described herein.

Figure 3:
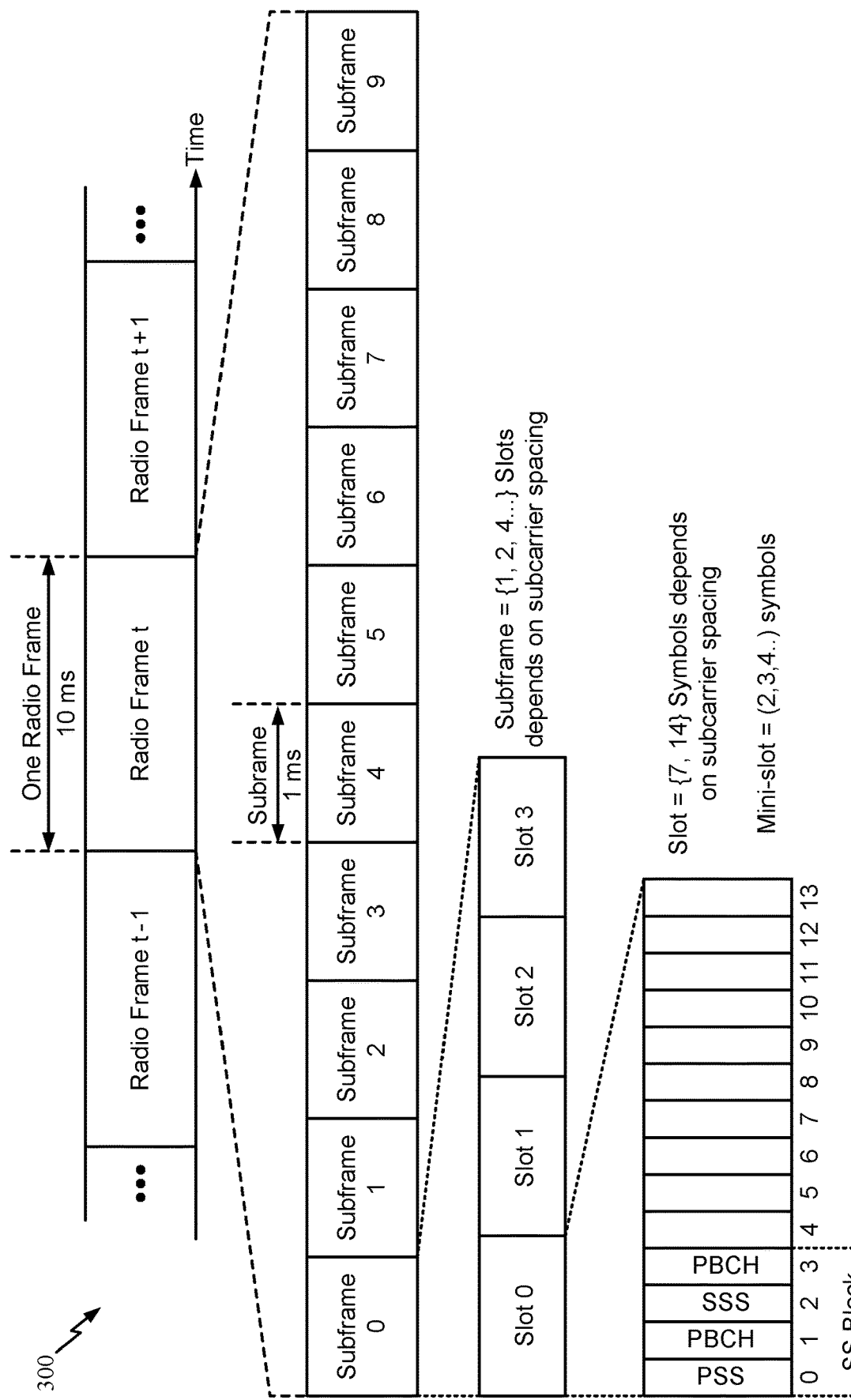
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmW. The up to sixty-four transmissions of the SSB are referred to as the SS burst set. SSBs in an SS burst set are transmitted in the same frequency region, while SSBs in different SS bursts sets can be transmitted at different frequency locations.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Figure 4A:
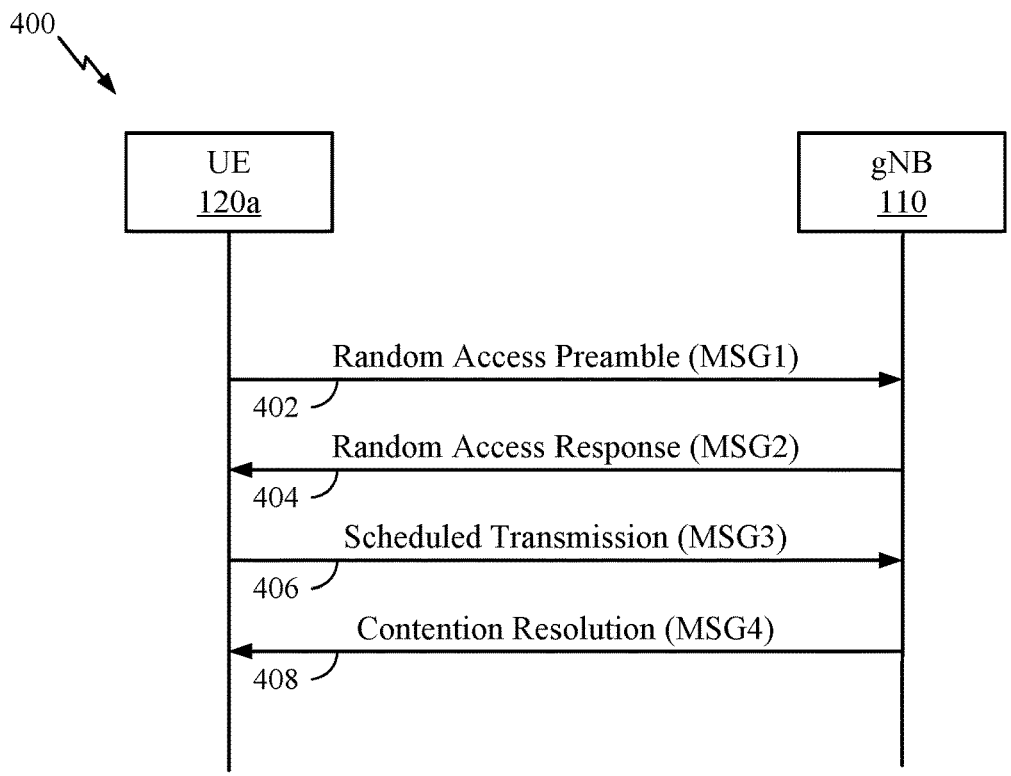
FIG. 4A is a call-flow diagram illustrating an example four-step random access channel (RACH) procedure, in accordance with certain aspects of the present disclosure.

FIG. 4A is a call-flow diagram illustrating an example four-step RACH procedure 400 for contention based random access (CBRA), in accordance with certain aspects of the present disclosure. A first message (MSG1) 402 may be sent from the UE 120 to gNB 110 on the physical random access channel (PRACH). In this case, MSG1 402 may only include a RACH preamble. gNB 110 may respond with a random access response (RAR) message (MSG2) 404 which may include the identifier (ID) of the RACH preamble, a timing advance (TA), an uplink grant, cell radio network temporary identifier (C-RNTI), and a back off indicator. MSG2 404 may include a PDCCH communication including control information for a following communication on the PDSCH, as illustrated. In response to MSG2 404, a third message (MSG3) 406 is transmitted from the UE 120 to gNB 110 on the PUSCH. MSG3 406 may include one or more of a RRC connection request, a tracking area update request, a system information request, a positioning fix or positioning signal request, or a scheduling request. The gNB 110 then responds with a fourth message (MSG4) 408 which may include a contention resolution message. In contention-free random access the preamble is assigned to the UE 120 and last two messages are skipped.

Figure 4B:
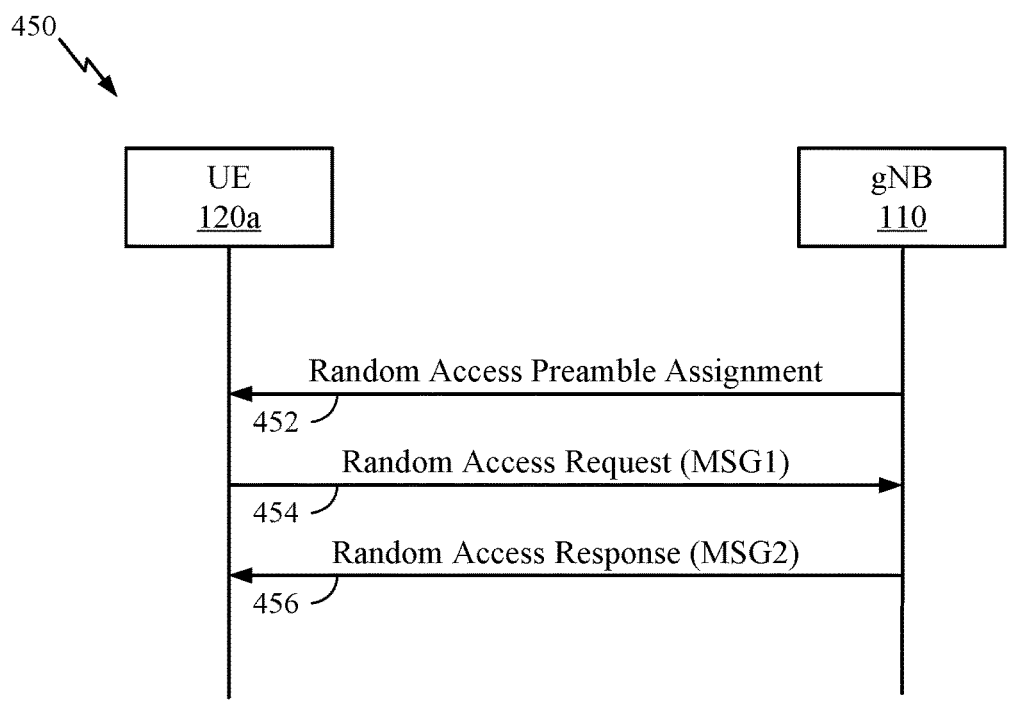
FIG. 4B is a call-flow diagram illustrating an example three-step RACH procedure, in accordance with certain aspects of the present disclosure.

FIG. 4B is a call-flow diagram illustrating a three-step RACH procedure 450 for contention free random access (CFRA), in accordance with certain aspects of the present disclosure. Initially, a dedicated preamble is assigned to the UE 120 via a random access preamble assignment 452. The assignment 452 may be communicated to the UE 120 via RRC signaling (the dedicated preamble can be specified within an RRC message) or L1 signaling (e.g., DCI on the PDCCH or MAC-CE). At 454, the UE 120 transmits MSG1 454 to gNB 110a. MSG1 454 is a combination of the PRACH preamble transmitted in the random access preamble assignment 452 and a scheduled transmission including an ID for contention resolution (e.g., MSG3 406 of the CBRA procedure illustrated in FIG. 4A). In response, the gNB 110 transmits MSG2 456 to the UE 120. MSG2 456 is a combination of random access response (e.g., MSG2 404 of the CBRA procedure and MSG4 408 of the CBRA process of FIG. 4A).

Figure 5:
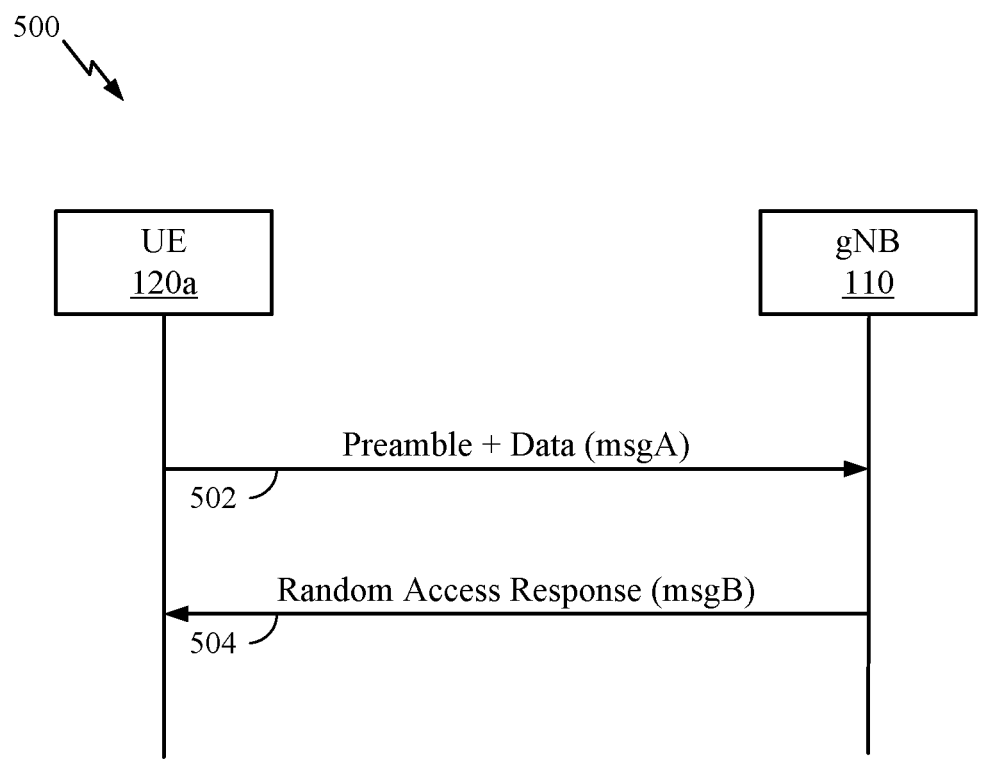
FIG. 5 is a call-flow diagram illustrating an example two-step RACH procedure, in accordance with certain aspects of the present disclosure.

FIG. 5 is a call-flow diagram illustrating a two-step RACH procedure 500, in accordance with certain aspects of the present disclosure. As the name implies, the two-step RACH procedure may effectively "collapse" the four messages of the four-step RACH procedure into two "enhanced" messages. For example, a 2-step RACH procedure may be used to form a connection between a UE and a new cell or base station. The 2-step RACH generally includes a message A (msgA) 502 and a message B (msgB) 504.

A first enhanced message (msgA) 502 may be sent from a UE 120 to a gNB 110, wherein msgA 502 may include a preamble and payload containing UE 120 information. In certain aspects, msgA 502 includes some or all the information from MSG1 402 and MSG3 406 from the four-step RACH procedure of FIG. 4A, effectively combining MSG1 402 and MSG3 406. For example, msgA 502 may include MSG1 402 and MSG3 406 multiplexed together such as using one of time-division multiplexing or frequency-division multiplexing. In certain aspects, msgA 502 includes a RACH preamble for random access and a payload. The msgA 502 payload, for example, may include the UE-ID and other signaling information (e.g., buffer status report (BSR)) or scheduling request (SR). The gNB 110 may respond with a random access response (RAR) message (msgB) 504 which may effectively combine MSG2 404 and MSG4 408 described above, which is used by the UE 120 to determine signal timing of the gNB 110, etc. For example, msgB 504 may include the ID of the RACH preamble, a timing advance (TA), a back off indicator, a contention resolution message, UL/DL grant, and transmit power control (TPC) commands.

As noted above, the UE 120 may send a preamble on a RACH occasion associated with a prior SSB transmission by the gNB 110. RACH procedures used for different purposes including initial access, synchronization, uplink scheduling request, beam-recovery, and the like. A RACH configuration of a cell typically specifies a number of SSB time indices per RACH time/frequency occasions (which could be one, less than one or greater than one).

However, a handover procedure initiated by L1/L2 communications may not be clearly defined by applicable wireless standards (e.g., 3rd generation partnership project (3GPP) standards). Accordingly, there is a need to define timing and transient periods during which a handover initiated by L1/L2 communications is performed. In some examples, a transient period may relate to a duration of time during a handover procedure wherein a UE 120 maintains a wireless communication link to each of a source cell and a target cell. Moreover, rules and operations of the wireless devices during such transient periods need to be defined to allow for uniform handover processes across devices and networks. Uniformity in such processes may improve user experience and mobile communications.

Example Operations for L1/L2 Based Cell Handover (HO)

Aspects of the present disclosure provide apparatus, methods, processing systems, and computer readable mediums for enabling L1/L2 inter-cell mobility (e.g., mobility of a UE between a first cell hosted by a first base station and a second cell hosted by a second base station) and intra-cell mobility (e.g., mobility of a UE between a first cell and a second cell, both of which are hosted by the first base station).

In certain aspects, a first base station (e.g., base station 110a of FIG. 1) may provide a UE (e.g., UE 120a of FIG. 1) with various signaling configured to provide the UE 120a with a capability for L1/L2-based inter-cell mobility operations. The signaling may be provided via radio resource control (RRC) signaling, a MAC-CE, or downlink control information (DCI). After receiving the signaling from the first cell 110a, the UE 120a is enabled to perform L1/L2 cell selection. In certain aspects, the UE 120a may perform L1/L2 cell selection based on information in DCI or MAC-CE messaging received from the first cell 110a. Alternatively, if the UE 120a was previously enabled for L1/L2-based inter-cell mobility operations, the UE 120a may signal an indication of the capability to support L1/L2 mobility to the first base station 110a.

If UE 120a supports L1/L2 mobility, the first base station 110a may send an L1/L2 handover command to the UE 120a. The handover command may include an indication of a target cell or target base station (e.g., base station 110 of FIG. 1) that the first base station 110a has selected for the UE 120a to communicate with. Upon receiving the command, the UE 120a may perform a handover procedure configured to (e.g., seamlessly) transfer communication with the UE 120a from the first base station 110a (or a cell of the first base station 110a) to the target cell or target base station indicated in the L1/L2 cell selection command. Subsequently, the UE communicates with (e.g., transmits data and control signaling to, and receives data and control signaling from) the target cell or target base station.

In certain aspects, transient periods during an L1/L2 cell handover may be defined by how and when a source cell and a target cell transmit data to the UE 120a. Such transient periods are defined to enable efficient serving cell handovers.

While the following examples are directed to inter-cell mobility, the techniques and methods described in the examples apply to intra-cell mobility with equal force.

Example Transient Periods for L1/L2 Based Cell Handover (HO)

Figure 6:
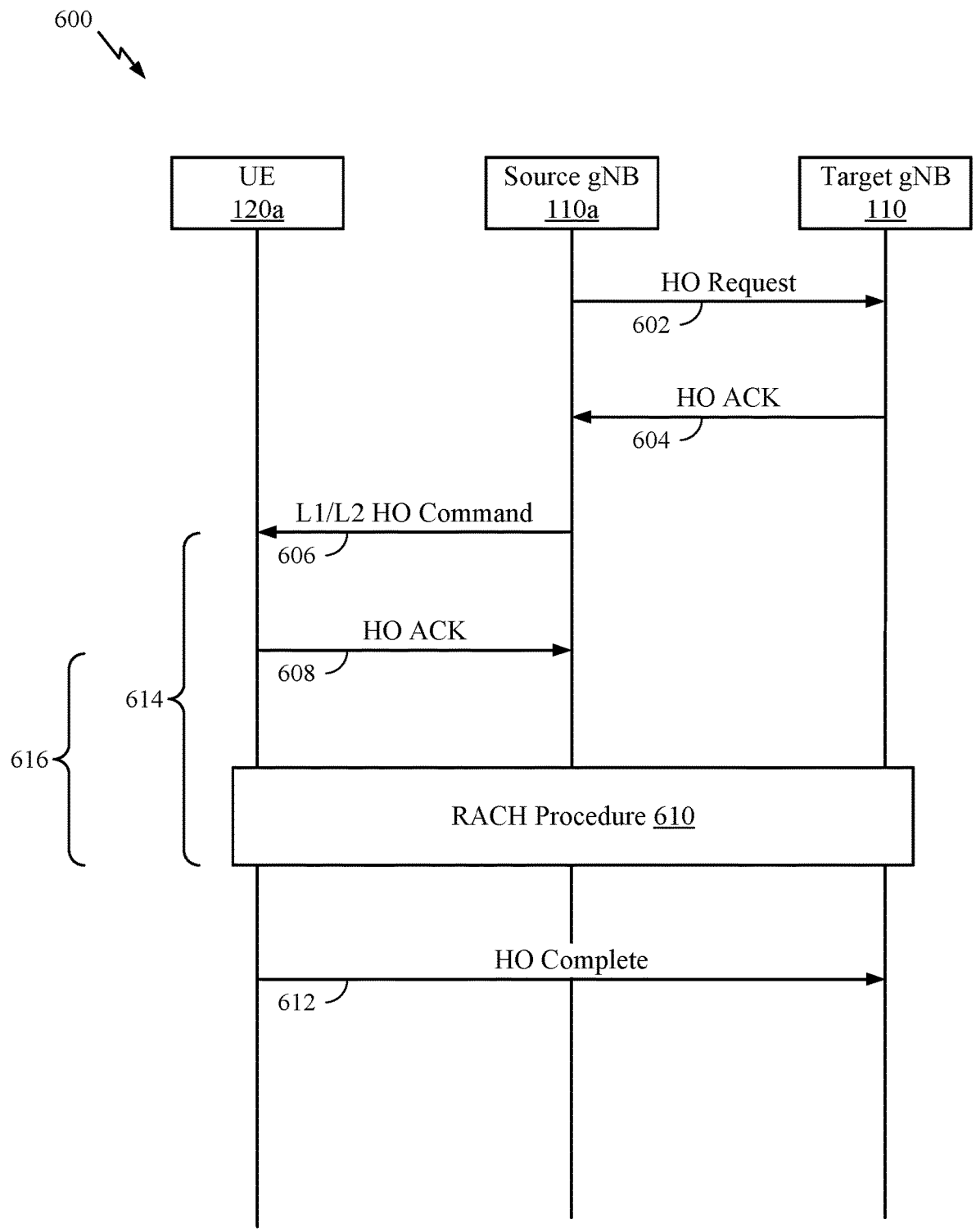
FIG. 6 is a call-flow diagram illustrating a first example of transient periods during a handover process, in accordance with some aspects of the present disclosure.

FIG. 6 is a call-flow diagram illustrating a handover procedure 600 for handing over a UE (e.g., UE 120a of FIGS. 1 and 2) from a source cell (e.g., base station 110a of FIGS. 1 and 2) to a target cell (e.g., base station 110 of FIG. 1). It should be noted that one or more of the signaling illustrated in FIG. 6, or described below, may be transmitted over L1 (e.g., DCI) or L2 (e.g., MAC-CE). In some examples, all of the signaling may be transmitted using L1 or L2.

Initially, the source base station 110a transmits a handover request 602 to the target base station 110. In response to the request, the target base station 110 may transmit a handover ACK 604 approving and acknowledging the source base stations 110a request. After receiving the handover ACK 604, the source base station 110a may transmit an L1/L2 handover command 606 to the UE 120a, initiating, from the UE 120a perspective, a handover of the UE 120a from the source base station 110a to the target base station 110. As noted in the name, the L1/L2 handover command 606 may be communicated to the UE 120a via control signaling, and may comprise physical layer (layer 1) information and/or MAC (layer 2) information. That is, the L1/L2 handover command 606 may be communicated via a downlink control information (DCI) message or MAC control element (MAC-CE). The UE 120a may respond to the command with a handover ACK message 608.

Thereafter, the UE 120a may initiate a random access channel (RACH) procedure 610 on the target base station 110. The RACH procedure 610 may include any of the RACH procedures illustrated in FIGS. 4A, 4B, and 5. Once the RACH procedure 610 is completed, the UE 120a may transmit a handover completed message 612 to the target base station 110 indicating the UE 120a has completed the RACH procedure and has successfully formed a wireless communication link with the target base station 110.

As discussed, during a cell handover, the UE 120a may maintain a wireless communication link with the source base station 110a and the target cell 110 during a transient period. That is, the UE 120a may have dual-connectivity with both the source and the target for a period of time during the handover.

In certain aspects, a first transient period 614 of the handover procedure 600 may be defined as a period of time that begins from an L1/L2 handover command 606 reception time at the UE 120a, and ends at a time that the RACH procedure 610 is completed between the UE 120a and the target base station 110. In one example, the L1/L2 handover command 606 reception time may be defined as the end of the DCI or MAC-CE transmission carrying the handover command from the source base station 110a. In another example, the time that the RACH procedure 610 is completed may be defined as the end of transmission of MSG2 or MSG4 of the RACH procedure (e.g., MSG2 404 or MSG4 408 of the CBRA RACH procedure 400 illustrated in FIG. 4A, or MSG2 454 of the CFRA RACH procedure 450 illustrated in FIG. 4B). Alternatively, the time that the RACH procedure 610 is completed may be defined as the end of transmission of msgB (e.g., msgB 504 of the 2-step RACH procedure 500 illustrated in FIG. 5) to the UE 120a, or upon transmission of an ACK message by the UE 120a to the target base station 110 in response to the transmission of msgB.

In certain aspects, a second transient period 616 of the handover procedure 600 may be defined as a period of time that begins after the handover ACK 608 transmitted by the UE 120a in response to the L1/L2 handover command 606. Similar to the first transient period 614, the second transient period 616 may end at a time that the RACH procedure 610 is completed between the UE 120a and the target base station 110, as defined above.

Figure 7:
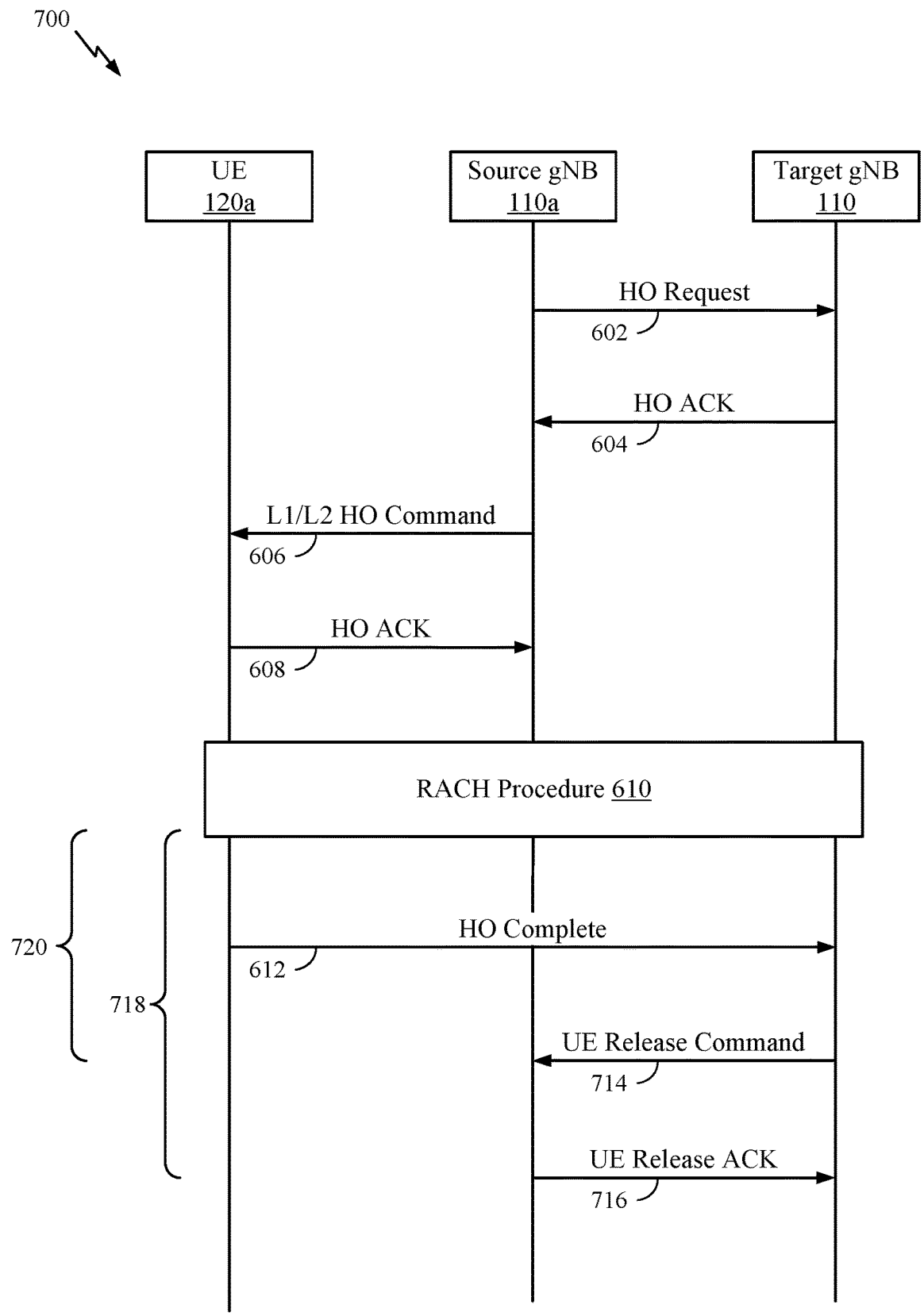
FIG. 7 is a call-flow diagram illustrating a second example of transient periods during a handover process, in accordance with some aspects of the present disclosure.

FIG. 7 is a call-flow diagram illustrating a handover procedure 700 for handing over a UE 120a from a source base station 110a to a target base station 110. In this example, the communications leading up to the RACH procedure 610, the RACH procedure 610, and the handover complete message 612 may be the same as those illustrated in FIG. 6 and described above. It should be noted that one or more of the signaling illustrated in FIG. 7, or described below, may be transmitted over L1 (e.g., DCI) or L2 (e.g., MAC-CE). In some examples, all of the signaling may be transmitted using L1 or L2.

In response to the handover complete message 612, the target base station 110 may transmit a UE release message 714 (also known as a UE context release command) to the source base station 110a. The UE release message 714 may include a request that the source base station 110a release its communication with the UE 120a. In response to the UE release message 714, the source base station 110a may release the UE 120a and transmit a UE release ACK 716 to the target base station 110 after successful release of the UE 120a. Here, the UE release ACK 716 may be used to indicate that the source base station 110a has completed its release of the UE 120a.

In certain aspects, a first transient period 718 may be defined as a period of time that begins from a time that the target cell RACH procedure is completed (as described above in the description of FIG. 6), and ends at a time that the UE release message 714 is received. For example, the time that the UE release message 714 is received may be defined as the end of the transmission (e.g., DCI or MAC-CE) from the target base station 110 carrying the UE release message 714.

A second transient period 720 may be defined as a period of time that begins from a time that the target cell RACH procedure is completed (as described above in the description of FIG. 6), and ends at the end of a transmission from the source base station 110a carrying the UE release ACK 716.

Figure 8:
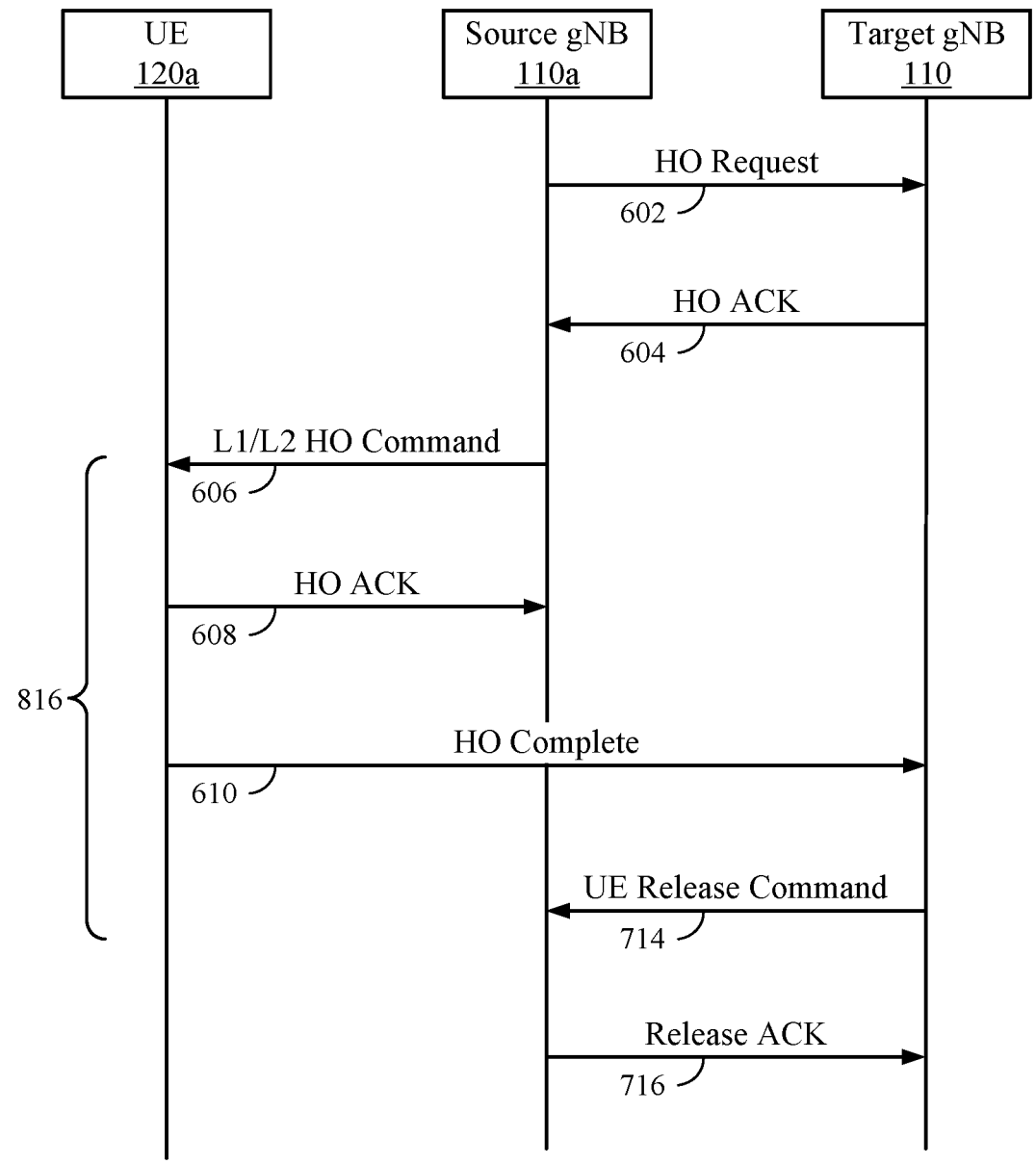
FIG. 8 is a call-flow diagram illustrating a third example of transient periods during a handover process, in accordance with some aspects of the present disclosure.

FIG. 8 is a call-flow diagram illustrating a handover procedure 800 for handing over a UE 120a from a source base station 110a to a target base station 110. In this example, the communications may be the same as those illustrated in FIGS. 6 and 7, and described above. In this example, the handover may be performed without a RACH procedure. It should be noted that one or more of the signaling illustrated in FIG. 8, or described below, may be transmitted over L1 (e.g., DCI) or L2 (e.g., MAC-CE). In some examples, all of the signaling may be transmitted using L1 or L2.

In certain aspects, the transient period 816 may be defined as a period of time that begins from a time that a UE 120a receives the L1/L2 handover command 606 transmitted by the source base station 110a, to a time that the source base station 110a receives the UE release command 714 indicating that the handover is completed (as defined above in the second embodiment).

Example Operations During Transient Periods

During any of the transient periods of FIGS. 6-8, the UE 120a may perform certain operations or communicate according to certain rules as follows. While the rules and operations described below are applied and/or performed during a transient period, one or more of such rules and operations may not be applied and/or performed outside of the transient period. That is, one or more of the following rules and operations may only be applicable within a transient period.

For example, in certain aspects, the UE 120a may be configured to simultaneously receive transmissions from both the target base station 110 (e.g., target cell) and the source base station 110a (e.g., source cell) during a transient period. Similarly, the UE 120a may also be configured to simultaneously transmit communications to both the source cell and the target cell during a transient period.

In certain aspects, downlink and/or uplink traffic for both a source cell and a target cell can be multiplexed in space division multiplexing (SDM), frequency division multiplexing (FDM), or time division multiplexing (TDM). For example, the source cell and target cell can both transmit DL data and/or receive UL data to/from the UE 120a. In the case of TDM, if both the source cell and the target cell transmit downlink data to the UE 120a, the downlink transmissions of the source cell and target cell may be divided into different transmission time intervals (TTIs) (e.g., slots) over the same frequency band. In the case of FDM, the downlink transmissions of both the source cell and the target cell can occur simultaneously over different frequency bands. In the case of SDM, the downlink transmissions may be transmitted simultaneously and in the same frequency band, but over spatially separated beams (e.g., the source cell transmits over a first beam, and the target cell transmits over a second beam).

Similarly, the UE 120a may utilize TDM, FDM, or SDM to transmit uplink data to both the source cell and target cell. In certain aspects, the UE 120a may be configured for a particular method of multiplexing by the source cell via messaging before handover or by the L1/L2 handover command 606. For example, the source cell may configure the UE 120a for multiplexing uplink communications to the source cell with uplink communications to the target cell during a transient period.

In certain aspects, the UE 120a may monitor broadcast traffic and/or multicast traffic from the source cell and/or the target cell during the transient period. Alternatively, the UE 120a may not monitor the broadcast traffic or the multicast traffic of either of the source cell or the target cell during the transient period. In some examples, the UE 120a may not monitor one or both of broadcast traffic or the multicast traffic of one or both of the source cell or target cell if the UE 120a is in a power saving mode. As such, the UE 120a may prioritize one of the source cell or the target cell to monitor.

In certain aspects, the UE 120a may perform radio link monitoring (RLM) and/or bidirectional forwarding detection (BFD) on one or more of the source cell or the target cell. Alternatively, the UE 120a may not perform either RLM or BFD on any of the source cell or the target cell. In some examples, the UE 120a may not perform one or both of RLM or BFD if the UE 120a is in a power saving mode.

In certain aspects, the UE 120a may be configured to receive RRC messages from one or more of the source cell or target cell in support of L1/L2 handovers. In some examples, the RRC messages may provide the UE 120a with target cell information during the transitory period. Alternatively, the UE 120a may not receive RRC messaged from either of the source cell or the target cell.

In certain aspects, the UE 120a may be configured to maintain or stop an ongoing HARQ retransmission between the UE 120a and the source cell. In one example, when the UE 120a enters a transitory period, the UE 120a may no longer perform or maintain ongoing HARQ retransmissions with the source cell. Instead, the UE 120a may defer any retransmissions until after the handover is complete, and may perform the retransmission with the target cell. In another example, the UE 120a may continue perform and maintain ongoing HARQ retransmissions with the source cell during the transitory period. In certain aspects, the UE 120a may be configured to maintain or stop one or more of an ongoing radio link control (RLC) retransmission, or an RLC status report in RLC acknowledgement mode (AM), with the source cell during the transitory period. In one example, once the UE 120a enters a transitory period, the UE 120a may stop an ongoing RLC retransmission or an RLC status report. Alternatively, the UE 120a may maintain the ongoing RLC retransmission or an RLC status report upon entering the transitory period.

In certain aspects, the UE 120a may communicate (e.g., receive and transmit new data) with the target cell after the transient period. That is, the UE 120a may not communicate new data (e.g., data communicated via PDSCH/PUSCH) with the target cell during the transient period. Instead, the UE 120a may only communicate control information or broadcast/multicast information with the target cell during the transient period, while maintaining data communications with the source cell.

In certain aspects, and in case of an uplink QCL or downlink QCL conflict between simultaneous downlink and/or uplink transmissions from/to both the source cell and the target cell, the UE 120a may be configured to prioritize the downlink QCL or uplink QCL of one of the target cell or source cell over the other. Such prioritization may benefit intra-frequency intra-band handovers over FR2.

In certain aspects, an in case of simultaneous UL transmissions from the UE 120a to both the source cell and the target cell, the UE 120a may prioritize the UL transmission of one of the target cell or the source cell. Such prioritization may improve handovers on FR1. In certain aspects, both the source cell and the target cell may have a common packet data convergence protocol (PDCP) service data unit (SDU) sequence number. That is, during a transient period, the source cell may share a common space of PDCP SDU sequence numbers with the target cell.

Figure 9:
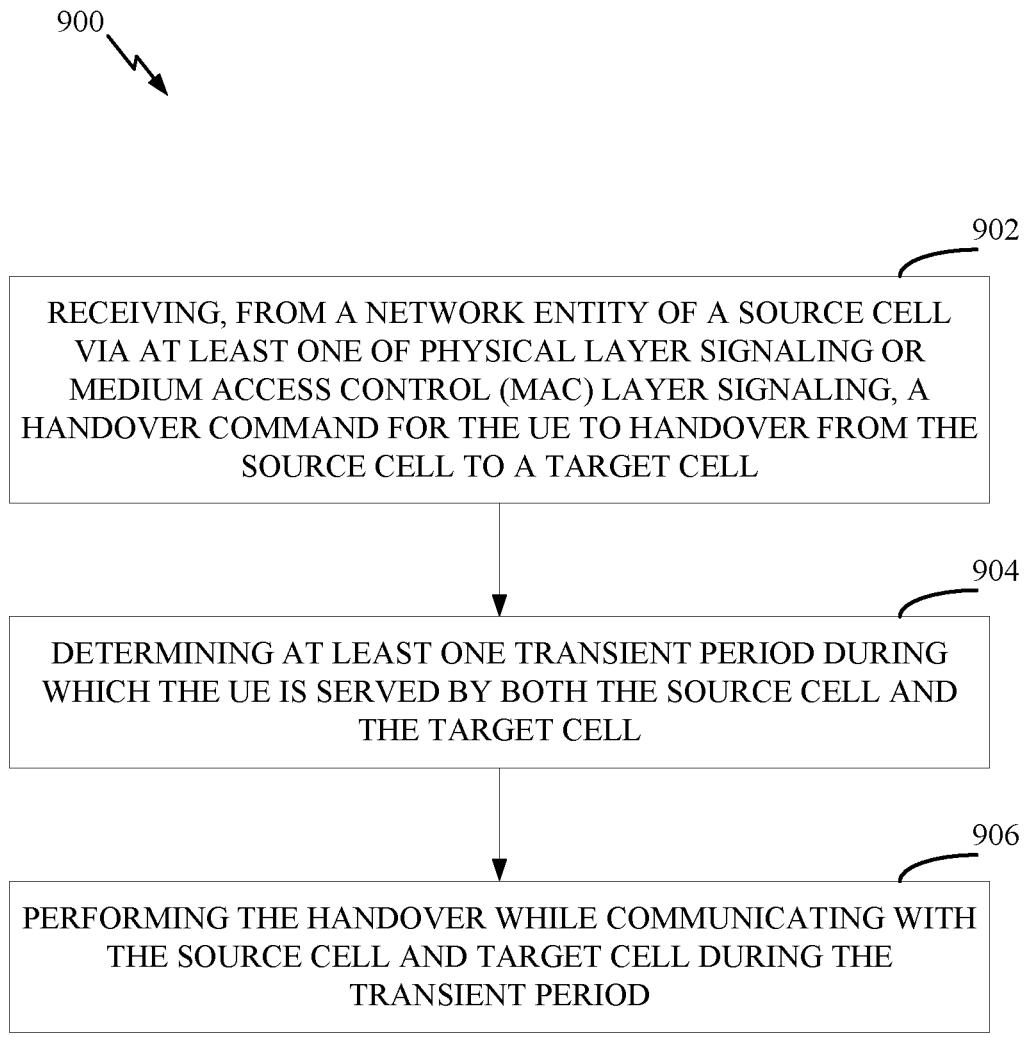
FIG. 9 is a flow diagram illustrating example operations for wireless communication by a UE, in accordance with certain aspects of the present disclosure.

FIG. 9 is a flow diagram illustrating example operations 900 for wireless communication according to various transient periods for L1/L2 cell handovers, in accordance with certain aspects of the present disclosure. The operations 900 may be performed, for example, by a UE (e.g., such as the UE 120a in the wireless communication network 100 of FIG. 1). The operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at a first block 902, where the UE receives, from a network entity via at least one of physical layer signaling or medium access control (MAC) layer signaling, a handover command for the UE to handover from at least one source cell to at least one target cell.

At a second block 904, the UE determines at least one transient period during which the UE is served by both the source cell and target cell.

At a third block 906, the UE performs the handover while communicating with the source cell and target cell during the transient period.

In certain aspects, the at least one transient period comprises one or more of: a first transient period comprising: a start time corresponding to receiving the handover command, and an end time corresponding to a completion of a random access channel (RACH) procedure performed in the target cell; a second transient period comprising: a start time corresponding to the completion of the RACH procedure performed in the target cell, and an end time corresponding to a transmission of a UE release command configured to cause the source cell to release a connection between the source cell and the UE; or a third transient period comprising: a start time corresponding to receiving the handover command, and an end time corresponding to the transmission of the UE release command configured to cause the source cell to release the connection between the source cell and the UE.

In certain aspects, the start time corresponding to receiving the handover command is defined by an end of a transmission of the physical layer signaling or the MAC layer signaling carrying the handover command, the physical layer signaling comprising a downlink control information (DCI), the MAC layer signaling comprising a MAC control element (CE).

In certain aspects, the operations 900 may include transmitting an acknowledgment (ACK) message to the network entity in response to the handover command, wherein the start time corresponding to receiving the handover command is defined by an end of the transmission carrying the ACK message.

In certain aspects, the operations 900 may include receiving, from the target cell during the RACH procedure, one of: a message 2 (MSG2) of a contention free random access (CFRA); or a message 4 (MSG4) of a contention based random access (CBRA); and transmitting an acknowledgment (ACK) message to the target cell in response to the MSG2 or the MSG4, wherein the end time corresponding to the completion of the RACH procedure is defined by one of: an end of the transmission carrying the ACK message, or an end of a transmission carrying one of the MSG2 or the MSG4.

In certain aspects, the RACH procedure is a 2-step RACH procedure, wherein the operations 900 further include receiving, from the target cell, a message B (msgB) of the 2-step RACH procedure; and transmitting an acknowledgment (ACK) message to the target cell in response to the msgB, wherein the end time corresponding to the completion of the RACH procedure is defined by an end of a transmission carrying one of the msgB or the ACK.

In certain aspects, the end time corresponding to the transmission of the UE release command is defined by an end of a transmission carrying the UE release command via one of a downlink control information (DCI) message or a MAC control element (CE).

In certain aspects, the end time corresponding to the transmission of the UE release command is defined by an end of a transmission carrying an acknowledgment (ACK) in response to the UE release command.

In certain aspects, during the at least one transient period, the method further comprises one or more of: receiving simultaneous downlink signaling from both the source cell and the target cell; or transmitting simultaneous uplink signaling to both the source cell and the target cell.

In certain aspects, operations 900 may include multiplexing the simultaneous uplink signaling according to one of spatial domain multiplexing (SDM), frequency domain multiplexing (FDM), or time domain multiplexing (TDM).

In certain aspects, operation 900 may include receiving a configuration message from the source cell configuring the UE to multiplex the simultaneous uplink signaling according to one of SDM, FDM, or TDM, wherein the configuration message is received with the handover command or prior to the handover command.

In certain aspects, the simultaneous downlink signaling is multiplexed according to one of spatial domain multiplexing (SDM), frequency domain multiplexing (FDM), or time domain multiplexing (TDM).

In certain aspects, operations 900 include monitoring, during the at least one transient period, for one or more of a broadcast signal or a multicast signal on one or more of the source cell or the target cell.

In certain aspects, operations 900 include refraining, during the at least one transient period, from monitoring for a broadcast signal or a multicast signal on either of the source cell or the target cell.

In certain aspects, operations 900 include performing, during the at least one transient period, one or more of radio link monitoring (RLM) or beam failure detection (BFD) on one or more of the source cell or the target cell.

In certain aspects, operations 900 include refraining, during the at least one transient period, from performing radio link monitoring (RLM) or beam failure detection (BFD) on either of the source cell or the target cell.

In certain aspects, operations 900 include receiving, during the at least one transient period, a radio resource control (RRC) message from one or more of the source cell or the target cell.

In certain aspects, operations 900 include refraining, during the at least one transient period, from receiving a radio resource control (RRC) message from either of the source cell or the target cell.

In certain aspects, operations 900 include continuing, during the at least one transient period, transmission of an ongoing hybrid automatic repeat request (HARQ) retransmission to the source cell, the HARQ retransmission starting prior to the at least one transient period.

In certain aspects, operations 900 include stopping, during the at least one transient period, an ongoing hybrid automatic repeat request (HARQ) retransmission to the source cell, the HARQ retransmission starting prior to the at least one transient period.

In certain aspects, operations 900 include continuing, during the at least one transient period, one or more of: transmitting an ongoing radio link control (RLC) retransmission to the source cell, wherein the RLC retransmission began prior to the at least one transient period, or generating an RLC status report in RLC acknowledged mode (AM) mode, both of the RLC retransmission and he RLC status report starting prior to the at least one transient period.

In certain aspects, operations 900 include stopping, during the at least one transient period, an ongoing radio link control (RLC) retransmission and the generation of the RLC status report, wherein the RLC retransmission began prior to the at least one transient period.

In certain aspects, operations 900 include one or more of transmitting, during the at least one transient period, uplink data to the target cell via a physical uplink shared channel (PUSCH); or receiving, during the at least one transient period, downlink data from the target cell via a physical downlink shared channel (PDSCH).

In certain aspects, operations 900 include determining that signals transmitted by the source cell and the target cell are quasi co-located; receiving the signals transmitted by the source cell and the target cell based at least in part on the determination that the signals are quasi co-located, the signals comprising a first signal transmitted by one of the source cell and the target cell and a second signal transmitted by the other of the source cell and the target cell; detecting, during the at least one transient period, interference in one or more of the first signal or the second signal, the interference being a result of the quasi co-located relationship between the first signal and the second signal; determining, during the at least one transient period, to prioritize signaling from one of the source cell and the target cell; and determining, during the at least one transient period, to receive only one of the first signal or the second signal based on which is the prioritized signaling.

In certain aspects, operations 900 include prioritizing one of the source cell or the target cell for uplink transmissions during the at least one transient period; and when a simultaneous uplink transmission to both the source cell and the target cell is scheduled during the at least one transient period, transmitting uplink signaling to the prioritized one of the source cell or the target cell and refraining from transmitting uplink signaling to the other of the source cell or the target cell.

Figure 10:
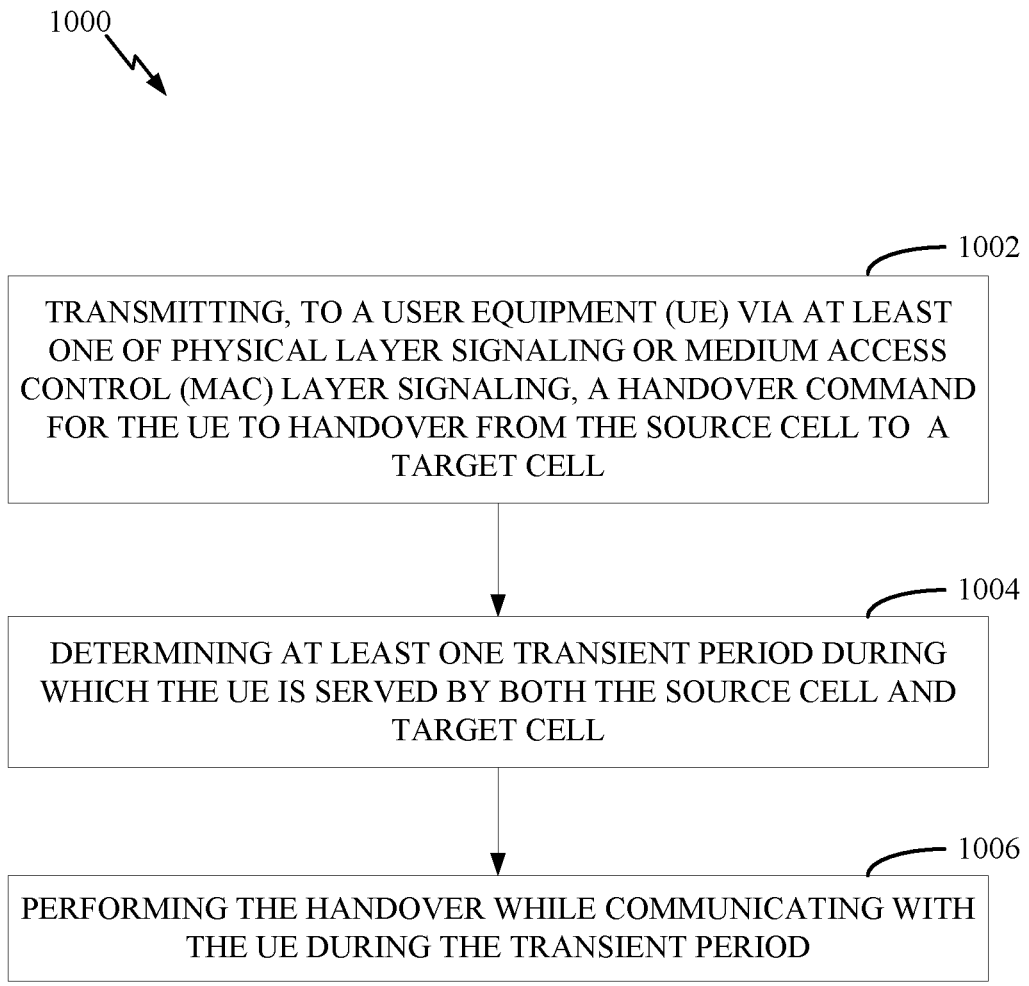
FIG. 10 is a flow diagram illustrating example operations for wireless communication by a BS, in accordance with certain aspects of the present disclosure.

FIG. 10 is a flow diagram illustrating example operations 1000 for wireless communication, in accordance with certain aspects of the present disclosure. The operations 1000 may be performed, for example, by a BS (e.g., such as the BS 110a in the wireless communication network 100). The operations 1000 may be complementary to the operations 1000 performed by the UE. The operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1000 may begin, at a first block 1002 by transmitting, to a user equipment (UE) via at least one of physical layer signaling or medium access control (MAC) layer signaling, a handover command for the UE to handover from the source cell to a target cell.

At a second block 1004, the operations 1000 include determining at least one transient period during which the UE is served by both the source cell and target cell.

At a third block 1006, the operations 1000 include performing the handover while communicating with the UE during the transient period.

In certain aspects, the at least one transient period comprises one or more of: a first transient period comprising: a start time corresponding to transmitting the handover command, and an end time corresponding to a completion of a random access channel (RACH) procedure performed in the target cell; a second transient period comprising: a start time corresponding to the completion of the RACH procedure performed in the target cell, and an end time corresponding to receiving, from the target cell, a UE release command configured to cause the source cell to release a connection between the source cell and the UE; or a third transient period comprising: a start time corresponding to transmitting the handover command, and an end time corresponding to receiving, from the target cell, the UE release command configured to cause the source cell to release the connection between the source cell and the UE.

In certain aspects, operations 1000 include determining that signals transmitted by the UE and the target cell are quasi co-located; receiving the signals transmitted by the UE and the target cell based at least in part on the determination that the signals are quasi co-located, the signals comprising a first signal transmitted by one of the UE and the target cell and a second signal transmitted by the other of the UE and the target cell; detecting, during the at least one transient period, interference in one or more of the first signal or the second signal, the interference being a result of the quasi co-located relationship between the first signal and the second signal; determining, during the at least one transient period, to prioritize signaling from one of the UE and the target cell; and determining, during the at least one transient period, to receive only one of the first signal or the second signal based on which is the prioritized signaling.

Figure 11:
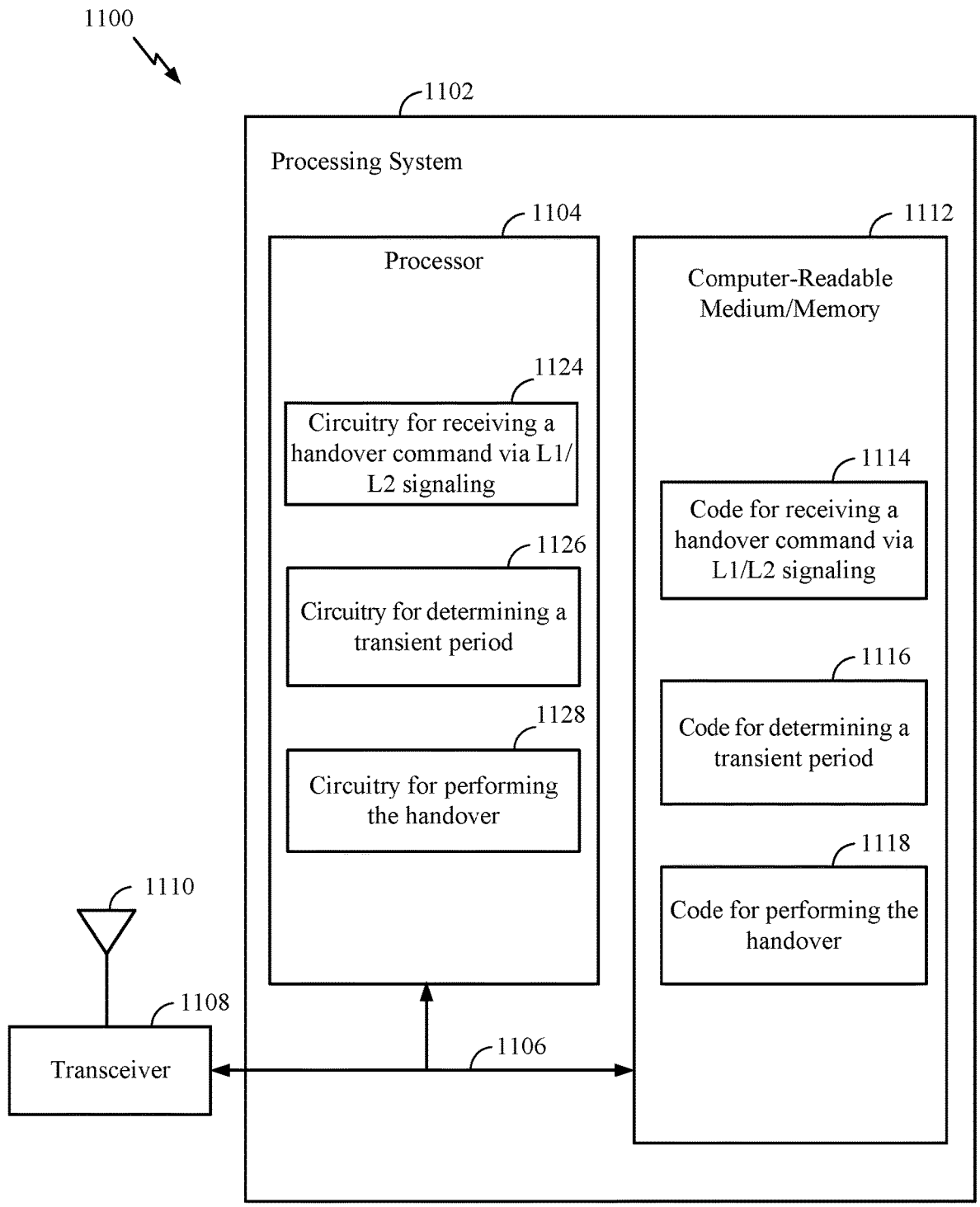
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein for operations during transitory periods of L1/L2 centric cell handovers. In certain aspects, computer-readable medium/memory 1112 stores code 1114 for receiving, from a network entity of a source cell via at least one of physical layer signaling or medium access control (MAC) layer signaling, a handover command for the UE to handover from the source cell to a target cell; code 1116 for determining at least one transient period during which the UE is served by both the source cell and the target cell, and code 1118 for performing the handover while communicating with the source cell and target cell during the transient period. In certain aspects, the processor 1104 has circuitry configured to implement the code stored in the computer-readable medium/memory 1112. The processor 1104 includes circuitry 1124 for receiving, from a network entity of a source cell via at least one of physical layer signaling or medium access control (MAC) layer signaling, a handover command for the UE to handover from the source cell to a target cell; circuitry 1126 for determining at least one transient period during which the UE is served by both the source cell and the target cell, and circuitry 1128 for performing the handover while communicating with the source cell and target cell during the transient period.

For example, means for transmitting (or means for outputting for transmission) may include a transmitter and/or an antenna(s) 234 or the BS 110a or the transmitter unit 254 and/or antenna(s) 252 of the UE 120a illustrated in FIG. 2. Means for receiving (or means for obtaining) may include a receiver and/or an antenna(s) 234 of the BS 110a or a receiver and/or antenna(s) 252 of the UE 120a illustrated in FIG. 2 and/or circuitry 1124 for receiving a handover command via L1/L2 signaling of the communication device 1100 in FIG. 11. Means for communicating may include a transmitter, a receiver or both. Means for generating, means for performing, means for determining, means for taking action, means for coordinating, and the like may include a processing system, which may include one or more processors, such as the transmit processor 220, the TX MIMO processor 230, the receive processor 238, and/or the controller/processor 240 of the BS 110a or the receive processor 258, the transmit processor 264, the TX MIMO processor 266, and/or the controller/processor 280 of the UE 120a illustrated in FIG. 2, and/or circuitry 1126 for determining a transient period and circuitry 1128 for performing the handover, of the processing system 1102 of the communication device 1100 in FIG. 11.

Figure 12:
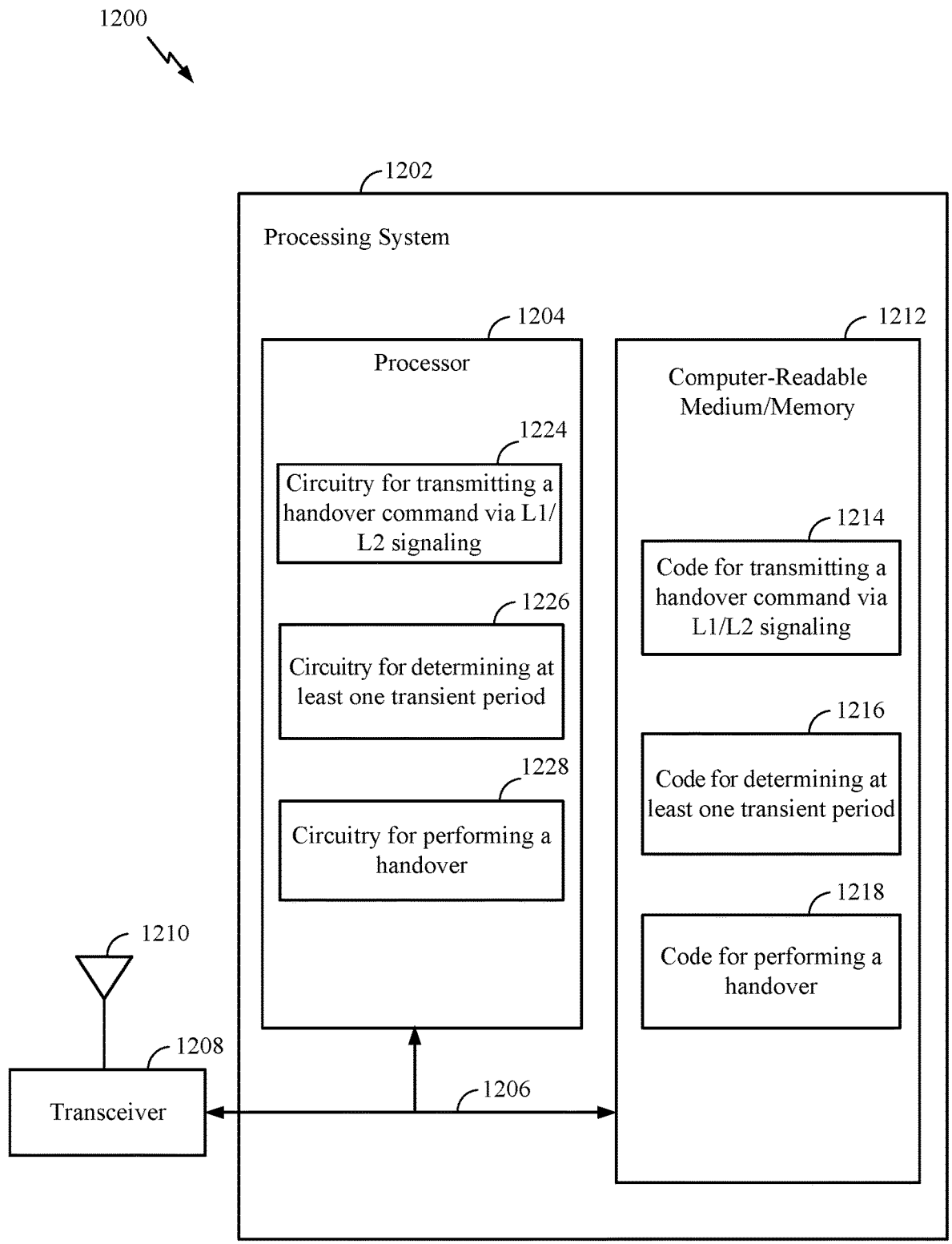
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 10. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 10, or other operations for performing the various techniques discussed herein for operations during transitory periods of L1/L2 centric cell handovers. In certain aspects, computer-readable medium/memory 1212 stores code 1214 for transmitting, to a user equipment (UE) via at least one of physical layer signaling or medium access control (MAC) layer signaling, a handover command for the UE to handover from the source cell to a target cell; code 1216 for determining at least one transient period during which the UE is served by both the source cell and target cell, and code 1218 for determining at least one transient period during which the UE is served by both the source cell and target cell. In certain aspects, the processor 1204 has circuitry configured to implement the code stored in the computer-readable medium/memory 1212. The processor 1204 includes circuitry 1224 for transmitting, to a user equipment (UE) via at least one of physical layer signaling or medium access control (MAC) layer signaling, a handover command for the UE to handover from the source cell to a target cell; circuitry 1226 for determining at least one transient period during which the UE is served by both the source cell and target cell, circuitry 1228 for performing the handover while communicating with the UE during the transient period.

For example, means for transmitting (or means for outputting for transmission) may include a transmitter and/or an antenna(s) 234 or the BS 110*a* or the transmitter unit 254 and/or antenna(s) 252 of the UE 120*a* illustrated in FIG. 2 and/or circuitry 1224 for transmitting a handover command via L1/L2 signaling of the communication device 1200 in FIG. 12. Means for receiving (or means for obtaining) may include a receiver and/or an antenna(s) 234 of the BS 110*a* or a receiver and/or antenna(s) 252 of the UE 120*a* illustrated in FIG. 2. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110*a* or the receive processor 258, the transmit processor 264, the TX MIMO processor 266, and/or the controller/processor 280 of the UE 120*a* illustrated in FIG. 2, and/or circuitry 1226 for determining at least one transient period and circuitry 1228 for performing a handover of the processing system 1202 of the communication device 1200 in FIG. 12.

EXAMPLE ASPECTS

Implementation examples are described in the following numbered clauses:

Aspect 1. A method for wireless communications by a user equipment (UE), comprising: receiving, from a network entity of a source cell via at least one of physical layer signaling or medium access control (MAC) layer signaling, a handover command for the UE to handover from the source cell to a target cell; determining at least one transient period during which the UE is served by both the source cell and the target cell; and performing the handover while communicating with the source cell and target cell during the transient period.

Aspect 2. The method of aspect 1, wherein the at least one transient period comprises one or more of: a first transient period comprising: a start time corresponding to receiving the handover command, and an end time corresponding to a completion of a random access channel (RACH) procedure performed in the target cell; a second transient period comprising: a start time corresponding to the completion of the RACH procedure performed in the target cell, and an end time corresponding to a transmission of a UE release command configured to cause the source cell to release a connection between the source cell and the UE; or a third transient period comprising: a start time corresponding to receiving the handover command, and an end time corresponding to the transmission of the UE release command configured to cause the source cell to release the connection between the source cell and the UE.

Aspect 3. The method of aspect 2, wherein the start time corresponding to receiving the handover command is defined by an end of a transmission of the physical layer signaling or the MAC layer signaling carrying the handover command, the physical layer signaling comprising a downlink control information (DCI), the MAC layer signaling comprising a MAC control element (CE).

Aspect 4. The method of any of aspects 2 or 3, further comprising transmitting an acknowledgment (ACK) message to the network entity in response to the handover command, wherein the start time corresponding to receiving the handover command is defined by an end of the transmission carrying the ACK message.

Aspect 5. The method of any of aspects 2-4, further comprising receiving, from the target cell during the RACH procedure, one of: a message 2 (MSG2) of a contention free random access (CFRA); or a message 4 (MSG4) of a contention based random access (CBRA); and transmitting an acknowledgment (ACK) message to the target cell in response to the MSG2 or the MSG4, wherein the end time corresponding to the completion of the RACH procedure is defined by one of: an end of the transmission carrying the ACK message, or an end of a transmission carrying one of the MSG2 or the MSG4.

Aspect 6. The method of any of aspects 2-5, wherein the RACH procedure is a 2-step RACH procedure, the method further comprising: receiving, from the target cell, a message B (msgB) of the 2-step RACH procedure; and transmitting an acknowledgment (ACK) message to the target cell in response to the msgB, wherein the end time corresponding to the completion of the RACH procedure is defined by an end of a transmission carrying one of the msgB or the ACK.

Aspect 7. The method of any of aspects 2-6, wherein the end time corresponding to the transmission of the UE release command is defined by an end of a transmission carrying the UE release command via one of a downlink control information (DCI) message or a MAC control element (CE).

Aspect 8. The method of any of aspects 2-7, wherein the end time corresponding to the transmission of the UE release command is defined by an end of a transmission carrying an acknowledgment (ACK) in response to the UE release command.

Aspect 9. The method of any of aspects 2-8, wherein during the at least one transient period, the method further comprises one or more of: receiving simultaneous downlink signaling from both the source cell and the target cell; or transmitting simultaneous uplink signaling to both the source cell and the target cell.

Aspect 10. The method of any of aspects 2-9, further comprising multiplexing the simultaneous uplink signaling according to one of spatial domain multiplexing (SDM), frequency domain multiplexing (FDM), or time domain multiplexing (TDM).

Aspect 11. The method of any of aspects 2-10, further comprising receiving a configuration message from the source cell configuring the UE to multiplex the simultaneous uplink signaling according to one of SDM, FDM, or TDM, wherein the configuration message is received with the handover command or prior to the handover command.

Aspect 12. The method of any of aspects 2-11, wherein the simultaneous downlink signaling is multiplexed according to one of spatial domain multiplexing (SDM), frequency domain multiplexing (FDM), or time domain multiplexing (TDM).

Aspect 13. The method of any of aspects 2-12, further comprising monitoring, during the at least one transient period, for one or more of a broadcast signal or a multicast signal on one or more of the source cell or the target cell.

Aspect 14. The method of any of aspects 2-13, further comprising refraining, during the at least one transient period, from monitoring for a broadcast signal or a multicast signal on either of the source cell or the target cell.

Aspect 15. The method of any of aspects 2-14, further comprising performing, during the at least one transient period, one or more of radio link monitoring (RLM) or beam failure detection (BFD) on one or more of the source cell or the target cell.

Aspect 16. The method of any of aspects 2-15, further comprising refraining, during the at least one transient period, from performing radio link monitoring (RLM) or beam failure detection (BFD) on either of the source cell or the target cell.

Aspect 17. The method of any of aspects 2-16, further comprising receiving, during the at least one transient period, a radio resource control (RRC) message from one or more of the source cell or the target cell.

Aspect 18. The method of any of aspects 2-17, further comprising refraining, during the at least one transient period, from receiving a radio resource control (RRC) message from either of the source cell or the target cell.

Aspect 19. The method of any of aspects 2-18, further comprising continuing, during the at least one transient period, transmission of an ongoing hybrid automatic repeat request (HARQ) retransmission to the source cell, the HARQ retransmission starting prior to the at least one transient period.

Aspect 20. The method of any of aspects 2-19, further comprising stopping, during the at least one transient period, an ongoing hybrid automatic repeat request (HARQ) retransmission to the source cell, the HARQ retransmission starting prior to the at least one transient period.

Aspect 21. The method of any of aspects 2-20, further comprising continuing, during the at least one transient period, one or more of: transmitting an ongoing radio link control (RLC) retransmission to the source cell, wherein the RLC retransmission began prior to the at least one transient period, or generating an RLC status report in RLC acknowledged mode (AM) mode, both of the RLC retransmission and he RLC status report starting prior to the at least one transient period.

Aspect 22. The method of any of aspects 2-21, further comprising stopping, during the at least one transient period, an ongoing radio link control (RLC) retransmission and the generation of the RLC status report, wherein the RLC retransmission began prior to the at least one transient period.

Aspect 23. The method of any of aspects 2-22, further comprising one or more of: transmitting, during the at least one transient period, uplink data to the target cell via a physical uplink shared channel (PUSCH); or receiving, during the at least one transient period, downlink data from the target cell via a physical downlink shared channel (PDSCH).

Aspect 24. The method of any of aspects 2-23, further comprising: determining that signals transmitted by the source cell and the target cell are quasi co-located; receiving the signals transmitted by the source cell and the target cell based at least in part on the determination that the signals are quasi co-located, the signals comprising a first signal transmitted by one of the source cell and the target cell and a second signal transmitted by the other of the source cell and the target cell; detecting, during the at least one transient period, interference in one or more of the first signal or the second signal, the interference being a result of the quasi co-located relationship between the first signal and the second signal; determining, during the at least one transient period, to prioritize signaling from one of the source cell and the target cell; and determining, during the at least one transient period, to receive only one of the first signal or the second signal based on which is the prioritized signaling.

Aspect 25. The method of any of aspects 2-24, further comprising: prioritizing one of the source cell or the target cell for uplink transmissions during the at least one transient period; and when a simultaneous uplink transmission to both the source cell and the target cell is scheduled during the at least one transient period, transmitting uplink signaling to the prioritized one of the source cell or the target cell and refraining from transmitting uplink signaling to the other of the source cell or the target cell.

Aspect 26. An apparatus comprising means for performing the method of any of aspects 1 through 25.

Aspect 27. An apparatus comprising at least one processor and a memory coupled to the at least one processor, the memory comprising code executable by the at least one processor to cause the apparatus to perform the method of any of aspects 1 through 25.

Aspect 28. A computer readable medium storing computer executable code thereon for wireless communications that, when executed by at least one processor, cause an apparatus to perform the method of any of aspects 1 through 25.

Aspect 29. A method for wireless communications by a network entity of a source cell, comprising: transmitting, to a user equipment (UE) via at least one of physical layer signaling or medium access control (MAC) layer signaling, a handover command for the UE to handover from the source cell to a target cell; determining at least one transient period during which the UE is served by both the source cell and target cell; and performing the handover while communicating with the UE during the transient period.

Aspect 30. The method of Aspect 29, wherein the at least one transient period comprises one or more of: a first transient period comprising: a start time corresponding to transmitting the handover command, and an end time corresponding to a completion of a random access channel (RACH) procedure performed in the target cell; a second transient period comprising: a start time corresponding to the completion of the RACH procedure performed in the target cell, and an end time corresponding to receiving, from the target cell, a UE release command configured to cause the source cell to release a connection between the source cell and the UE; or a third transient period comprising: a start time corresponding to transmitting the handover command, and an end time corresponding to receiving, from the target cell, the UE release command configured to cause the source cell to release the connection between the source cell and the UE.

Aspect 31. The method of Aspect 29, further comprising: determining that signals transmitted by the UE and the target cell are quasi co-located; receiving the signals transmitted by the UE and the target cell based at least in part on the determination that the signals are quasi co-located, the signals comprising a first signal transmitted by one of the UE and the target cell and a second signal transmitted by the other of the UE and the target cell; detecting, during the at least one transient period, interference in one or more of the first signal or the second signal, the interference being a result of the quasi co-located relationship between the first signal and the second signal; determining, during the at least one transient period, to prioritize signaling from one of the UE and the target cell; and determining, during the at least one transient period, to receive only one of the first signal or the second signal based on which is the prioritized signaling.

Aspect 32. An apparatus comprising means for performing the method of any of aspects 29 through 31.

Aspect 33. An apparatus comprising at least one processor and a memory coupled to the at least one processor, the memory comprising code executable by the at least one processor to cause the apparatus to perform the method of any of aspects 29 through 31.

Aspect 34. A computer readable medium storing computer executable code thereon for wireless communications that, when executed by at least one processor, cause an apparatus to perform the method of any of aspects 29 through 31.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
   receiving, from a network entity of a source cell via at least one of physical layer signaling or medium access control (MAC) layer signaling, a handover command for the UE to handover from the source cell to a target cell;
   determining a transient period during which the UE is served by both the source cell and the target cell, wherein the transient period comprises:
      a start time corresponding to a completion of a random access channel (RACH) procedure performed in the target cell, and
      an end time corresponding to a transmission of a UE release command configured to cause the source cell to release a connection between the source cell and the UE;
   prioritizing signaling from one of the source cell and the target cell during the transient period; and
   performing the handover while communicating simultaneously with both the source cell and target cell during the transient period.

2. The method of claim 1, wherein the start time corresponding to receiving the handover command is defined by an end of a transmission of the physical layer signaling or the MAC layer signaling carrying the handover command, the physical layer signaling comprising a downlink control information (DCI), the MAC layer signaling comprising a MAC control element (CE).

3. The method of claim 1, further comprising transmitting an acknowledgment (ACK) message to the network entity in response to the handover command, wherein the start time corresponding to receiving the handover command is defined by an end of the transmission carrying the ACK message.

4. The method of claim 1, further comprising:
receiving, from the target cell during the RACH procedure, one of:
  a message 2 (MSG2) of a contention free random access (CFRA); or
  a message 4 (MSG4) of a contention based random access (CBRA); and
transmitting an acknowledgment (ACK) message to the target cell in response to the MSG2 or the MSG4, wherein the end time corresponding to the completion of the RACH procedure is defined by one of:
  an end of the transmission carrying the ACK message, or
  an end of a transmission carrying one of the MSG2 or the MSG4.

5. The method of claim 1, wherein the RACH procedure is a 2-step RACH procedure, the method further comprising:
receiving, from the target cell, a message B (msgB) of the 2-step RACH procedure; and
transmitting an acknowledgment (ACK) message to the target cell in response to the msgB, wherein the end time corresponding to the completion of the RACH procedure is defined by an end of a transmission carrying one of the msgB or the ACK.

6. The method of claim 1, wherein the end time corresponding to the transmission of the UE release command is defined by an end of a transmission carrying the UE release command via one of a downlink control information (DCI) message or a MAC control element (CE).

7. The method of claim 1, wherein the end time corresponding to the transmission of the UE release command is defined by an end of a transmission carrying an acknowledgment (ACK) in response to the UE release command.

8. The method of claim 1, wherein during the transient period, the method further comprises one or more of:
receiving simultaneous downlink signaling from both the source cell and the target cell; or
transmitting simultaneous uplink signaling to both the source cell and the target cell.

9. The method of claim 8, further comprising multiplexing the simultaneous uplink signaling according to one of spatial domain multiplexing (SDM), frequency domain multiplexing (FDM), or time domain multiplexing (TDM).

10. The method of claim 9, further comprising receiving a configuration message from the source cell configuring the UE to multiplex the simultaneous uplink signaling according to one of SDM, FDM, or TDM, wherein the configuration message is received with the handover command or prior to the handover command.

11. The method of claim 8, wherein the simultaneous downlink signaling is multiplexed according to one of spatial domain multiplexing (SDM), frequency domain multiplexing (FDM), or time domain multiplexing (TDM).

12. The method of claim 1, further comprising monitoring, during the transient period, for one or more of a broadcast signal or a multicast signal on one or more of the source cell or the target cell.

13. The method of claim 1, further comprising refraining, during the transient period, from monitoring for a broadcast signal or a multicast signal on either of the source cell or the target cell.

14. The method of claim 1, further comprising performing, during the transient period, one or more of radio link monitoring (RLM) or beam failure detection (BFD) on one or more of the source cell or the target cell.

15. The method of claim 1, further comprising refraining, during the transient period, from performing radio link monitoring (RLM) or beam failure detection (BFD) on either of the source cell or the target cell.

16. The method of claim 1, further comprising receiving, during the transient period, a radio resource control (RRC) message from one or more of the source cell or the target cell.

17. The method of claim 1, further comprising refraining, during the transient period, from receiving a radio resource control (RRC) message from either of the source cell or the target cell.

18. The method of claim 1, further comprising continuing, during the transient period, transmission of an ongoing hybrid automatic repeat request (HARQ) retransmission to the source cell, the HARQ retransmission starting prior to the transient period.

19. The method of claim 1, further comprising stopping, during the transient period, an ongoing hybrid automatic repeat request (HARQ) retransmission to the source cell, the HARQ retransmission starting prior to the transient period.

20. The method of claim 1, further comprising continuing, during the transient period, one or more of:
transmitting an ongoing radio link control (RLC) retransmission to the source cell, wherein the RLC retransmission began prior to the transient period, or
generating an RLC status report in RLC acknowledged mode (AM) mode, both of the RLC retransmission and the RLC status report starting prior to the transient period.

21. The method of claim 20, further comprising stopping, during the transient period, an ongoing radio link control (RLC) retransmission and the generation of the RLC status report, wherein the RLC retransmission began prior to the transient period.

22. The method of claim 1, further comprising one or more of:
transmitting, during the transient period, uplink data to the target cell via a physical uplink shared channel (PUSCH); or
receiving, during the transient period, downlink data from the target cell via a physical downlink shared channel (PDSCH).

23. The method of claim 1, further comprising:
determining that signals transmitted by the source cell and the target cell are in a quasi co-located relationship;
receiving the signals transmitted by the source cell and the target cell based at least in part on the determination that the signals are quasi co-located, the signals comprising a first signal transmitted by one of the source cell and the target cell and a second signal transmitted by the other of the source cell and the target cell;
detecting, during the transient period, interference in one or more of the first signal or the second signal, the interference being a result of the quasi co-located relationship between the first signal and the second signal; and
determining, during the transient period, to receive only one of the first signal or the second signal based on which is the prioritized signaling.

24. The method of claim 1, further comprising:
when a simultaneous uplink transmission to both the source cell and the target cell is scheduled during the transient period, transmitting uplink signaling to the prioritized one of the source cell or the target cell and refraining from transmitting uplink signaling to the other of the source cell or the target cell.

25. A method for wireless communications by a network entity of a source cell, comprising:
transmitting, to a user equipment (UE) via at least one of physical layer signaling or medium access control (MAC) layer signaling, a handover command for the UE to handover from the source cell to a target cell;
determining a transient period during which the UE is served by both the source cell and target cell, wherein the transient period comprises:
a start time corresponding to a completion of a random access channel (RACH) procedure performed in the target cell, and
an end time corresponding to a transmission of a UE release command configured to cause the source cell to release a connection between the source cell and the UE; and
based on prioritized signaling from the UE during the transient period, performing the handover while communicating with the UE during the transient period while the target cell communicates with the UE simultaneously.

26. The method of claim 25, further comprising:
determining that signals transmitted by the UE and the target cell are in a quasi co-located relationship;
receiving the signals transmitted by the UE and the target cell based at least in part on the determination that the signals are quasi co-located, the signals comprising a first signal transmitted by one of the UE and the target cell and a second signal transmitted by the other of the UE and the target cell;
detecting, during the transient period, interference in one or more of the first signal or the second signal, the interference being a result of the quasi co-located relationship between the first signal and the second signal;
determining, during the transient period, to prioritize signaling from one of the UE and the target cell; and
determining, during the transient period, to receive only one of the first signal or the second signal based on which is the prioritized signaling.

27. A user equipment (UE), comprising:
a transceiver;
a memory; and
a processor coupled to the transceiver and the memory, the memory comprising code executable by the processor to cause the UE to:
receive, from a network entity of a source cell via at least one of physical layer signaling or medium access control (MAC) layer signaling, a handover command for the UE to handover from the source cell to a target cell;
determine a transient period during which the UE is served by both the source cell and the target cell, wherein the transient period comprises:
a start time corresponding to a completion of a random access channel (RACH) procedure performed in the target cell, and
an end time corresponding to a transmission of a UE release command configured to cause the source cell to release a connection between the source cell and the UE;
prioritize signaling from one of the source cell and the target cell during the transient period; and
perform the handover while communicating simultaneously with both the source cell and target cell during the transient period.

28. A network entity of a source cell, comprising:
a transceiver;
a memory; and
a processor coupled to the transceiver and the memory, the memory comprising code executable by the processor to cause the network entity to:
transmit, to a user equipment (UE) via at least one of physical layer signaling or medium access control (MAC) layer signaling, a handover command for the UE to handover from the source cell to a target cell;
determine a transient period during which the UE is served by both the source cell and target cell, wherein the transient period comprises:
a start time corresponding to a completion of a random access channel (RACH) procedure performed in the target cell, and
an end time corresponding to a transmission of a UE release command configured to cause the source cell to release a connection between the source cell and the UE; and
based on prioritized signaling from the UE during the transient period, perform the handover while communicating with the UE during the transient period while the target cell communicates with the UE simultaneously.

* * * * *